(12) United States Patent
Park et al.

(10) Patent No.: US 8,907,899 B2
(45) Date of Patent: Dec. 9, 2014

(54) ELECTRONIC DEVICE WITH TOUCH DEVICE AND METHOD OF EXECUTING FUNCTIONS THEREOF ACCORDING TO RELATIVE TOUCH POSITIONS

(75) Inventors: Tae Jin Park, Seoul (KR); Joo Min Kim, Seoul (KR); Jung Ah Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 1229 days.

(21) Appl. No.: 12/205,504

(22) Filed: Sep. 5, 2008

(65) Prior Publication Data

US 2009/0289904 A1    Nov. 26, 2009

(30) Foreign Application Priority Data

May 20, 2008   (KR) ........................ 10-2008-0046463
Aug. 12, 2008   (KR) ........................ 10-2008-0079103

(51) Int. Cl.
G06F 3/041   (2006.01)
G06F 3/033   (2013.01)
G06F 3/0481   (2013.01)
G06F 3/0488   (2013.01)

(52) U.S. Cl.
CPC .... *G06F 3/0488* (2013.01); *G06F 2203/04808* (2013.01); *G06F 3/04817* (2013.01)
USPC .......................................... 345/173; 715/863

(58) Field of Classification Search
USPC .................................. 345/156–183; 715/863
See application file for complete search history.

(56) References Cited

U.S. PATENT DOCUMENTS

| | | | |
|---|---|---|---|
| 7,015,894 B2 | 3/2006 | Morohoshi | |
| 2006/0026521 A1* | 2/2006 | Hotelling et al. | 715/863 |
| 2006/0161870 A1 | 7/2006 | Hotelling et al. | |
| 2008/0036743 A1* | 2/2008 | Westerman et al. | 345/173 |
| 2008/0284742 A1* | 11/2008 | Prest et al. | 345/173 |
| 2008/0297471 A1* | 12/2008 | Hill et al. | 345/156 |
| 2009/0122022 A1* | 5/2009 | Park et al. | 345/173 |
| 2009/0164951 A1* | 6/2009 | Kumar | 715/863 |
| 2009/0199130 A1* | 8/2009 | Tsern et al. | 345/173 |

FOREIGN PATENT DOCUMENTS

| | | | |
|---|---|---|---|
| JP | 2000-163031 A | 6/2000 | |
| JP | 2003-173237 A | 6/2003 | |

* cited by examiner

*Primary Examiner* — Ryan A Lubit
(74) *Attorney, Agent, or Firm* — Birch, Stewart, Kolasch & Birch, LLP (57) ABSTRACT

An electronic device having a touch panel and a corresponding control method, the method including: receiving a first touch to a first position on the touch panel; receiving a second touch to a second position on the touch panel while the first touch is held to the first position; and executing a function corresponding to a relative position of the second position with respect to the first position.

32 Claims, 7 Drawing Sheets

ELECTRONIC DEVICE WITH TOUCH DEVICE AND METHOD OF EXECUTING FUNCTIONS THEREOF ACCORDING TO RELATIVE TOUCH POSITIONS

CROSS REFERENCES TO RELATED APPLICATIONS

This nonprovisional application claims priorities under 35 U.S.C. §119(a) on Patent Application No. 10-2008-0046463 filed in Republic of Korea on May 20, 2008 and Patent Application No. 10-2008-0079103 filed in Republic of Korea on Aug. 12, 2008 the entire contents of which are hereby incorporated by references.

BACKGROUND OF THE INVENTION

1. Field of the Invention

This document relates to a touch device, and more specifically to an electronic device equipped with a touch device and a method of executing functions of the electronic device, which can provide a user with a convenient interface by employing device characteristics of the touch device.

2. Discussion of the Related Art

In recent years, with the technological developments of touch devices, touch devices, such as a touch pad or a touch screen, are used in various kinds of electronic devices. An electronic device equipped with a touch device can provide a user with a new environment different from that of an existing input method. For example, in the case in which an electronic device is equipped with a touch screen, a user can input information or commands through the touch screen. Accordingly, there is an advantage in that the electronic device needs not to be equipped with additional input devices. As the recognition ratio and accuracy of the touch device is improved steadily, there is a tendency that the number of electronic devices equipped with the touch device gradually increases.

However, despite this technological development of the touch device, a user interface, which can fully take the advantages of device characteristics, has not been provided to a user. For example, there is a problem that electronic devices equipped with only the touch device, as an input device, give rise to more inconvenience to a user than electronic device equipped with a conventional key button type input device. In particular, in the case of mobile terminals equipped with the touch screen, there is an urgent need for the development of a user interface, enabling a user to interact with the terminal conveniently.

SUMMARY OF THE INVENTION

An aspect of this document is to provide an electronic device equipped with a touch device and a method of executing functions thereof, which provide a new concept of a user interface that enables a user to input information or commands conveniently through the touch device.

According to an aspect of this document, a method of executing functions in an electronic device equipped with a touch device comprises receiving a touch input with respect to a first point on the touch device (hereinafter referred to as a 'first touch input'); receiving a touch input with respect to a second point on the touch device (hereinafter referred to as a 'second touch input') within a predetermined time period from a time point of the first touch input; and executing a function corresponding to a relative position of the second point with respect to the first point.

According to another aspect of this document, a method of executing functions in an electronic device equipped with a touch device comprises selecting an object displayed on the touch screen by a touch on the object (hereinafter referred to as a 'first touch input'); receiving a touch input with respect to a position different from that of the first touch (hereinafter referred to as a 'second touch input') within a predetermined time period from a time point of the first touch input; and executing a function corresponding to a relative position of the second touch input with respect to the first touch input, as a function regarding the object.

According to a further aspect of this document, an electronic device equipped with a touch device comprises the touch device; and a controller for executing a function corresponding to a relative position of a second point with respect to a first point, when a touch on the first point on the touch device (hereinafter referred to as a 'first touch input') is received and a touch on the second point on the touch device (hereinafter referred to as a 'second touch input') is received within a predetermined time period from a time point of the first touch input.

According to still further aspect of this document, an electronic device equipped with a touch device comprises the touch device; and a controller for executing a function corresponding to a relative position of a second touch input with respect to a first touch input, as a function regarding an object, when the object displayed on the touch screen is selected by a touch on the object (hereinafter referred to as a 'first touch input') and a touch input with respect to a position different from that of the first touch (hereinafter referred to as a 'second touch input') is received within a predetermined time period from a time point of the first touch input.

BRIEF DESCRIPTION OF THE DRAWINGS

The implementation of this document will be described in detail with reference to the following drawings in which like numerals refer to like elements.

DETAILED DESCRIPTION

Hereafter, exemplary embodiments of this document will be described in more detail with reference to the accompanying drawings.

Merits and characteristics of this document, and methods for accomplishing them will become more apparent from the following embodiments taken in conjunction with the accompanying drawings. This document will now be described in detail in connection with preferred embodiments with reference to the accompanying drawings. It is to be noted that in assigning reference numerals to constituent elements of the respective drawings, the same reference numerals designate the same elements although the elements are shown in different drawings. Further, in describing this document, detailed description on the known functions and constructions will be omitted if they are deemed to make the gist of this document unnecessarily vague.

Figure 1:
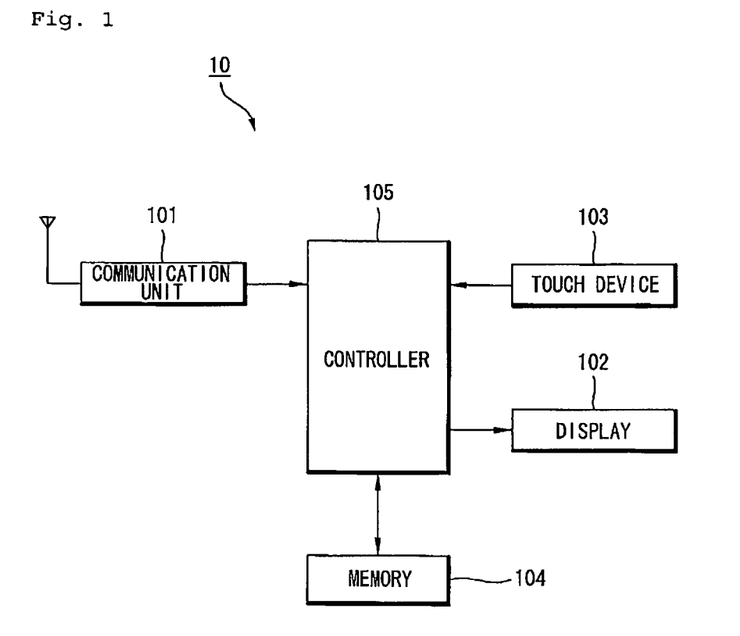
FIG. 1 is a block diagram showing the construction of an electronic device equipped with a touch device in accordance with a first embodiment of this document.

FIG. 1 is a block diagram showing the construction of an electronic device equipped with a touch device in accordance with a first embodiment of this document. An electronic device equipped with a touch device in accordance with a first embodiment of this document is described in detail below with reference to FIG. 1 and pertinent drawings.

An electronic device 10 equipped with a touch device 10 in accordance with a first embodiment of this document may comprises a communication unit 101, a display 102, a touch device 103, memory 104, and a controller 105.

The communication unit 101 accesses a wired or wireless network existing outside the electronic device 10 and transmits or receives data. For example, the communication unit 101 may comprise at least one of a broadcasting receiving module that receives broadcasting signals from a broadcasting station, a mobile communication module which can access a mobile communication network and transmit or receive data, and a mobile Internet module which can access a mobile Internet network, such as WiBro or WiMAX, and transmit or receive data.

The display 102 displays various pieces of information in response to a control signal output from the controller 105.

The touch device 103 is an input device capable of external touches. For example, a user can input various pieces of information or commands by touching a specific point of the touch device 103 using the finger or the stylus pen. Examples of the touch device 103 may comprise a touch pad, a touch screen, and so on. A device in which the display 102 and the touch device 103 are integrated is generally called a touch screen. Touch inputs mentioned in this document comprise all physical touches and proximity touch.

The memory 104 stores a specific program for controlling an operation of the electronic device 10 and can store various data temporarily or permanently, which are input/output and processed when the controller 105 performs an overall operation of the electronic device 10.

The controller 105 controls the constituent elements and is generally responsible for the overall operation of the electronic device 10 equipped with a touch device in accordance with the embodiment of this document.

Detailed operations of the electronic device 10 equipped with a touch device in accordance with the embodiments of this documents and a method of executing functions in the electronic device 10 equipped with a touch device in accordance with the embodiments of this documents are described below with reference to pertinent drawings. Hereinafter, the touch device 103 and the display 102 are called a touch screen 102, 103, for convenience of description. However, it is to be understood that, in this document, the touch device 103 is not limited to the touch screen.

Figure 2:
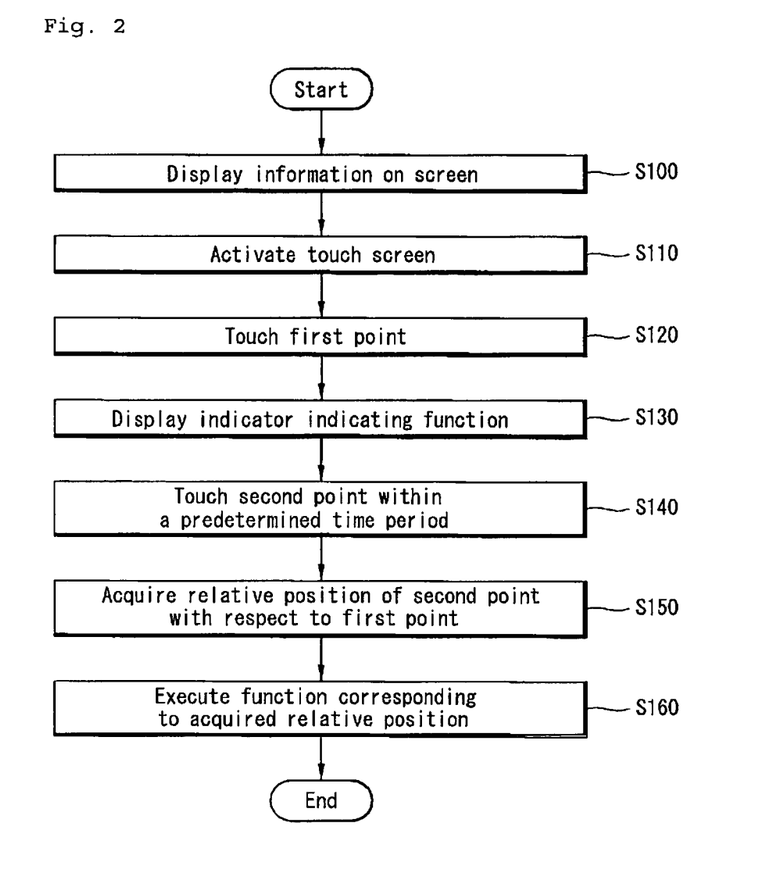
FIG. 2 is a flowchart illustrating a method of executing functions in the electronic device equipped with the touch device in accordance with a first embodiment of this document.
Figure 3:
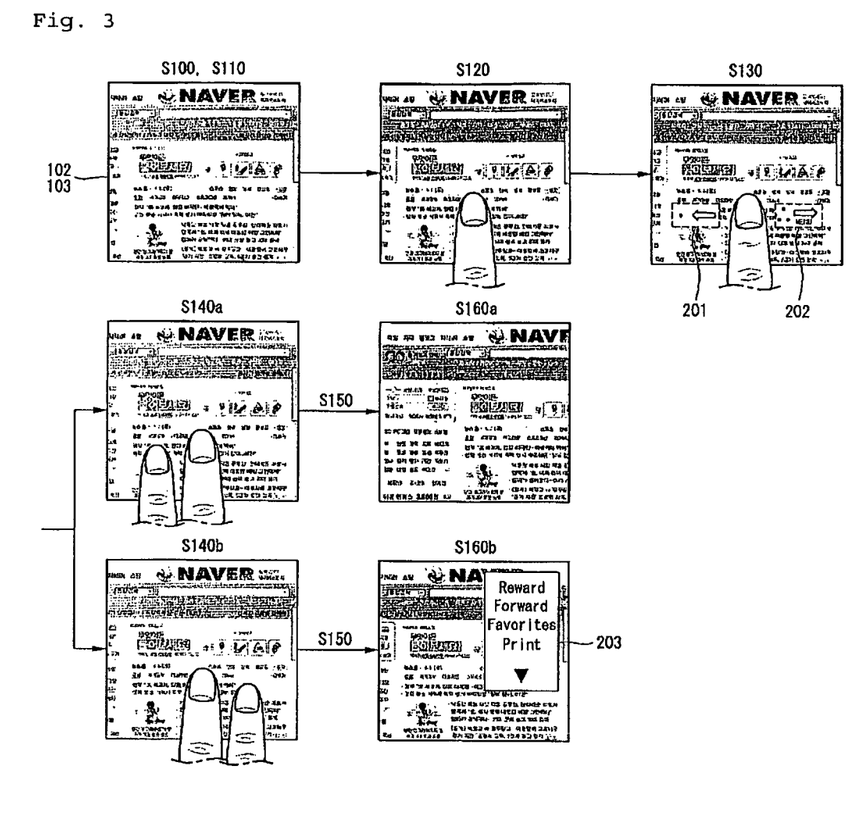
FIG. 3 is a diagram showing examples in which the method of executing functions is implemented in the electronic device equipped with the touch device in accordance with a first embodiment of this document.

FIG. 2 is a flowchart illustrating a method of executing functions in the electronic device equipped with the touch device in accordance with a first embodiment of this document. FIG. 3 is a diagram showing examples in which the method of executing functions is implemented in the electronic device equipped with the touch device in accordance with a first embodiment of this document. The method of executing functions in the electronic device equipped with the touch device in accordance with a first embodiment of this document can be executed in the electronic device 10 shown in FIG. 1. The method of executing functions in the electronic device equipped with the touch device in accordance with a first embodiment of this document and detailed operations of the electronic device 10 for implementing the method are described below in detail.

The controller 105 displays information on the touch screen 102, 103 [S100]. The display information may be various. For example, information, such as the desktop including a plurality of icons, web pages provided by specific web sites when an Internet is accessed, and menu trees, can be displayed on the touch screen 102, 103. For example, referring to FIG. 3, the controller 105 can display a specific web page when the electronic device 10 accesses an Internet.

The controller 105 activates the touch screen 102, 103 [S110]. The activation of the touch screen 102, 103 refers to that it is ready to input information through the touch screen 102, 103. For example, before the touch screen 102, 103 is activated, no information is input although a user touches the touch screen 102, 103 using the finger.

In the steps S100 and S110 of FIG. 3, it is assumed that a web page is not displayed on one screen. In this case, a user can view information, which is not displayed, by scrolling the screen in the left and right directions or up and down directions. When the electronic device 10 is a portable terminal, there is a case where a large amount of information cannot be displayed on one screen of the electronic device 10 due to the screen size and/or resolution problem. When the electronic device 10 is a portable terminal supporting a high resolution, lots of information can be displayed on one screen of the electronic device 10. However, a user may have to enlarge the screen in order to check information due to a limited screen size. In this case, the electronic device 10 needs to provide the scrolling function in various directions such that a user can search for web pages conveniently.

The controller 105 receives a touch input with respect to a first point (hereinafter referred to as a 'first touch input') on the touch screen 102, 103 [S120]. For example, referring to FIG. 3, a user can touch an arbitrary point on the touch screen 102, 103 using the middle finger of the right hand.

When the first touch input is received, the controller 105 can display an indicator, guiding a function corresponding to a second touch input to be described later on, on the touch screen 102, 103 [S130].

For example, referring to FIG. 3, the controller 105 can display indicators 201 and 202 of a graphic form, including a plurality of icons, on the touch screen 102, 103.

Figure 4:
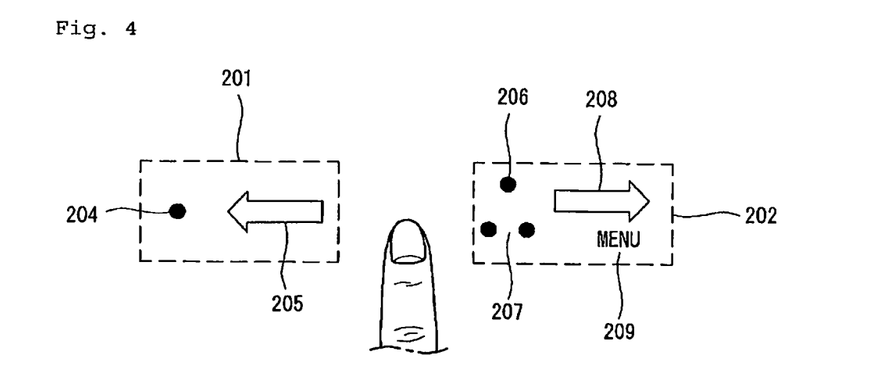
FIG. 4 is a detailed view of step S130 in FIG. 3.

FIG. 4 is a detailed view of the step S130 in FIG. 3. For example, the controller 105 can display an icon 204, referring to one touch on the left region of the first point, on the touch screen 102, 103. For example, when one touch 204 on the left region of the first point occurs, the controller 105 can display an icon 205, referring to that the screen is scrolled to the left, on the touch screen 102, 103.

For example, the controller 105 can display an icon 206, in response to one touch on the right region of the first point, and an icon 207, in response to twice touches on the right region of the first point within a specific time period, on the touch screen 102, 103. When one touch 206 on the right region of the first point occurs, the controller 105 can display an icon 208, referring to that a screen is scrolled to the right, on the touch screen 102, 103. When the twice touches 207 on the right region of the first point occurs within a specific time period, the controller 105 can display an icon 209, referring to that a menu regarding web browsing is displayed, on the touch screen 102, 103.

A user can instinctively know which function will be executed when which point is touched through the indicators 201 and 202.

The step S130 can be turned on/off by a user. For example, a user can turn on or off the indicator display function [S130] by employing a graphic user interface provided by the electronic device 10.

The controller 105 receives a touch input with respect to a second point (hereinafter referred to as a 'second touch input') on the touch screen 102, 103 within a predetermined time period since the time point on which the first touch input has been performed [S140].

The second touch input can be received in a state where the touch on the first point keeps intact or can be received after the touch on the first point is spaced apart from the touch screen 102, 103.

The second point is a point different from the first point. The second touch input may be various. For example, the second touch input may be one touch on the second point or plural touches within a specific time period. Further, for example, the second touch input may be a touch-and-drag operation or a flicking operation.

For example, referring to FIG. 3, a user can touch the left region of the first point within 0.8 seconds from a touch time point on the first point using the index finger of the right hand in a state where the touch on the first point keeps intact [S140a]. Alternatively, referring to FIG. 3, a user can touch the right region of the first point twice using the ring finger of the right hand in a state where the touch on the first point keeps intact [S140b].

The controller 105 acquires the relative position of a second point with respect to the first point [S150]. The controller 105 can acquire the relative position based on coordinate values of the first point and coordinate values of the second point, which are received from the touch screen 102, 103.

The controller 105 executes a function corresponding to the relative position acquired in the step S150 [S160].

The memory 104 can comprise a database in which a relative position of the second point with respect to the first points is made to correspond to a function. The database may comprise at least one correspondence between a relative position and a function.

The relative position may comprise a distance concept. For example, different functions may correspond to one another depending on the distances and positions of the second point with respect to the first point. For example, different functions may correspond to one another when the second point belongs to a 10 to 40-pixel range to the left from the first point and when the second point belongs to a 40 to 80-pixel range to the left from the first point.

The controller 105 can execute a function corresponding to the relative position, acquired in the step S150, with reference to the database [S160]. In other words, if a relative position of the second point with respect to the first point varies, a function executed in the step S160 may vary. For example, the executed functions may be different when the second point is in a left region of the first point and when the second point is in a right region of the first point.

Referring to FIG. 3, when a user touches the left side of the first point once [S140a], the screen can be scrolled to the left [S160a]. When a user touches the right side of the first point twice [S140b], a menu 203 regarding web browsing can be displayed [S160b].

The controller 105 can execute different functions depending on the number of touches on the second point. For example, in the step S140b of FIG. 3, if a user touches the screen twice as described above, the menu 203 can be displayed as in the step S160b. If a user touches the same point once, the screen can be scrolled to the right.

The memory 104 may comprise a database in which the number, type, etc. of touches with respect to the second point are made to correspond different functions as well as the relative position of the second point with respect to the first point. Correspondence between the relative position of the second point with respect to the first point and the function and correspondence between the number, type, etc. of touches with respect to the second point and the functions may be set by a user. The correspondences set by a user can be stored in the database.

The method of executing functions in the electronic device equipped with the touch device in accordance with a first embodiment of this document is irrespective of which information is displayed at which point on which the first and second touch inputs are performed on the touch screen 102, 103. That is, a point on which the first and second touch inputs are performed may comprise all points on the touch screen 102, 103.

As described above, the functions that may be executed in response to the one or more touches include a scroll function, an enlarge function, a delete function and a menu display function. Other functions include a delete function, a copy function, page change/turn function, a transmit function, an upload to a website function, a download from a website function, a flag for future reference function (e.g., mark as a favorite), a storage function, a text (e.g., spell check, word count, etc.) function, a repeat function, a format text function, a format image function, etc.

Figure 5:
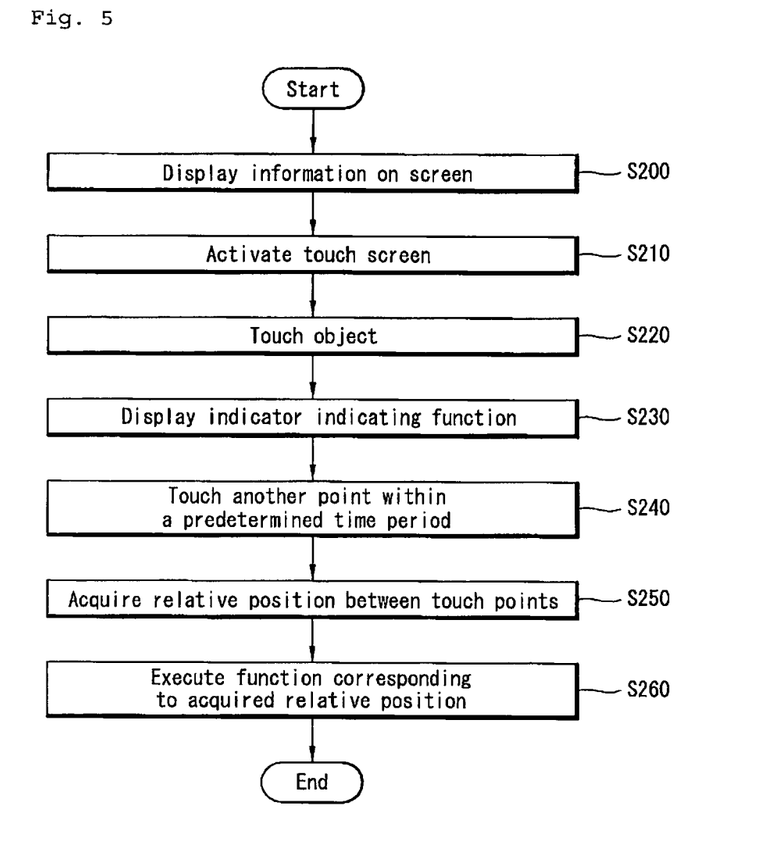
FIG. 5 is a flowchart illustrating a method of executing functions in the electronic device equipped with the touch device in accordance with a second embodiment of this document.
Figure 6:
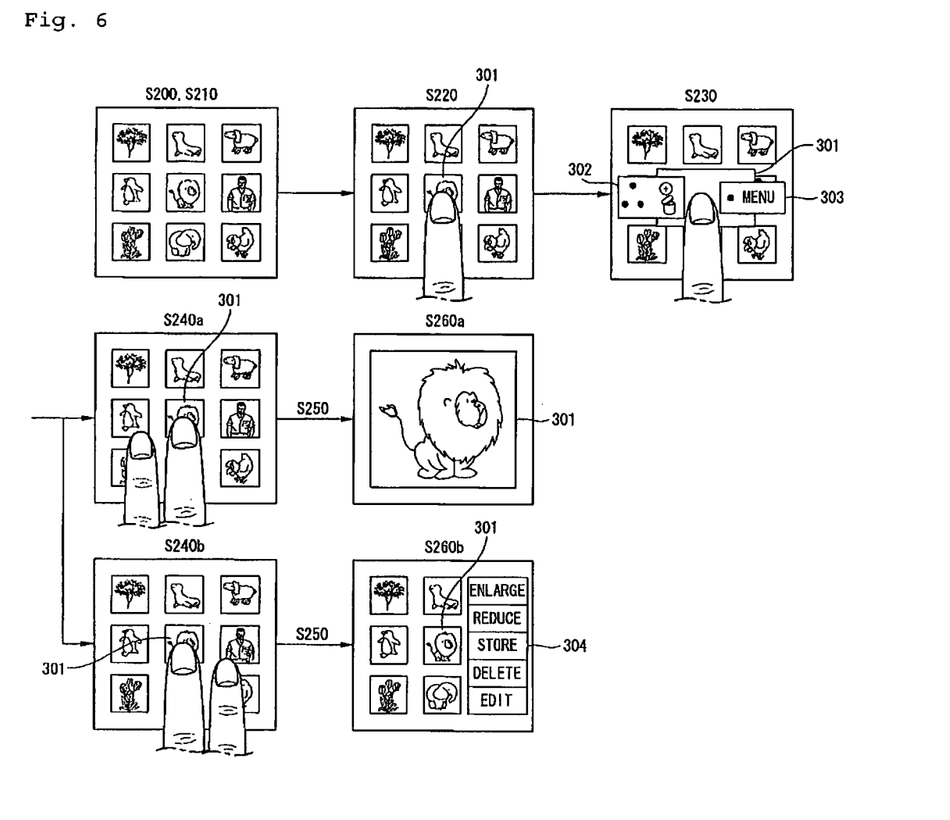
FIG. 6 is a diagram showing examples in which the method of executing functions is implemented in the electronic device equipped with the touch device in accordance with a second embodiment of this document.

FIG. 5 is a flowchart illustrating a method of executing functions in the electronic device equipped with the touch device in accordance with a second embodiment of this document. FIG. 6 is a diagram showing examples in which the method of executing functions is implemented in the electronic device equipped with the touch device in accordance with a second embodiment of this document. The method of executing functions in the electronic device equipped with the touch device in accordance with a second embodiment of this document can be executed in the electronic device 10 shown in FIG. 1. The method of executing functions in the electronic device equipped with the touch device in accordance with a second embodiment of this document and detailed operations of the electronic device 10 for implementing the method are described below in detail.

The controller 105 displays information on the touch screen 102, 103 [S200] and activates the touch screen 102, 103 [S210]. The steps S200 and S210 are identical to the steps S100 and S110 of the first embodiment of this document. However, in the step S200, at least one object is displayed on the touch screen 102, 103. Examples of the object can comprise selectable or executable icons, menus, and the like. Referring to FIG. 6, the controller 105 can display a plurality of photographs in the thumbnail view. Each of the plurality of photographs becomes one object.

The controller 105 receives a touch input with respect to a specific one of one or more objects (hereinafter referred to as a 'third touch input') displayed on the touch screen 102, 103 [S220]. The specific object is selected by a third touch input. For example, referring to FIG. 6, a user can select a specific photograph 301 by touching the specific photograph 301 using the middle finger of the right hand.

When the third touch input is received, the controller 105 can display an indicator, guiding a function corresponding to a fourth touch input to be described later on, on the touch screen 102, 103 [S230].

For example, referring to FIG. 6, when a touch input with respect to the specific photograph 301 is received [S220], the controller 105 can display indicators 302 and 303 of an icon form on the touch screen 102, 103.

Figure 7:
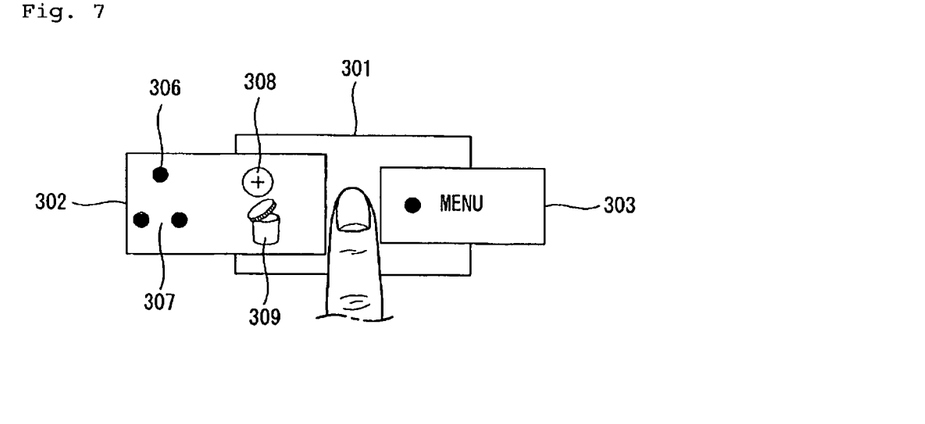
FIG. 7 is a detailed view of step S230 in FIG. 6.

FIG. 7 is a detailed view of the step S230 in FIG. 6. For example, the controller 105 can display an icon 306, referring to one touch on the left region of the first point, and an icon 307, referring to twice touches on the left region of the first point within a specific time period, on the touch screen 102, 103. Further, the controller 105 can display an icon 308, referring to that the specific photograph 301 is enlarged to a specific magnification when one touch 306 on the left region of the first point is generated, and an icon 308, referring to that the specific photograph 301 is deleted when the twice touches 307 on the left region of the first point are generated within a specific time period, on the touch screen 102, 103. Alternatively, when one touch on the right region of the first point is generated, the controller 105 can display an indicator 303, guiding that a menu for processing or controlling the specific photograph 301 is displayed, on the touch screen 102, 103. A user can instinctively know which function will be executed when which point is touched through the indicators 301 and 303.

The step S230 can be turned on/off by a user, which is identical to that in the first embodiment of this document.

The controller 105 receives a touch input with respect to a point different from a point on which the first touch input has been performed (hereinafter referred to as a 'fourth touch input') through the touch screen 102, 103 within a predetermined time period from a time point on which the third touch input has been performed [S240].

The fourth touch input can be received in a state where the touch on the third touch input keeps intact or can be received after the third touch input is spaced apart from the touch screen 102, 103, as in the first embodiment of this document.

The fourth touch input may be various as in the first embodiment of this document. For example, the fourth touch input may comprise at least one touch operation, at least one touch-and-drag operation or at least one flicking operation on a point on which the fourth touch input is performed.

For example, referring to FIG. 6, a user can touch the left-side point of a point where the specific photograph 301 is touched using the index finger of the right hand in a state where the touch on the specific photograph 301 keeps intact [S240a]. Further, for example, a user can touch the right region of a point where the specific photograph 301 is touched using the ring finger of the right hand in a state where the touch on the specific photograph 301 keeps intact [S240b].

The controller 105 acquires a relative position of the point on which the fourth touch input has been performed with respect to a point on which the third touch input has been performed [S250]. The step S250 corresponds to the above step S150.

The controller 105 executes a function corresponding to the relative position acquired in the step S250 [S260]. The step S260 corresponds to the step S160, but the function executed in the step S260 may be a function regarding an object selected in the step S220.

For example, referring to FIG. 6, when a user touches the left side of the specific photograph 301 [S240a], the specific photograph 301 can be enlarged [S260a]. When a user touches the right side of the specific photograph 301 [S240b], menus 304 for processing or controlling the specific photograph 301 can be displayed [S260b].

The controller 105 can perform different functions depending on the number of touches on the second point, as in the first embodiment of this document. For example, in the step S240a of FIG. 6, when a user touches a point, the specific photograph 301 can be enlarged, as in the step S260a, and when a user touches the same point twice, a screen or pop-up window for deleting the specific photograph 301 can be displayed.

The method of executing functions in the electronic device equipped with the touch device in accordance with the embodiments of this document can be recorded into a computer-readable recording medium, as a program for being executed in a computer, and then provided.

The method of executing functions in the electronic device equipped with the touch device in accordance with the embodiments of this document can be executed through a software program. When the method is executed through a software program, the constituting elements of this document are code segments that execute a specific task. The program or code segments can be stored in a processor-readable medium or transmitted through computer data signals combined with carriers in a transmission medium or a communication network.

The computer-readable recording medium may comprise all kinds of recording devices for storing data readable by a computer system. For example, the computer-readable recording medium may comprise ROM, RAM, CD-ROM, DVD±ROM, magnetic tapes, floppy disks, hard disks, optical data storages, and so on. Further, the computer-readable recording medium can be distributed into computer systems connected over a network, so that computer-readable codes can be stored and executed in a distributed manner.

Figure 8:
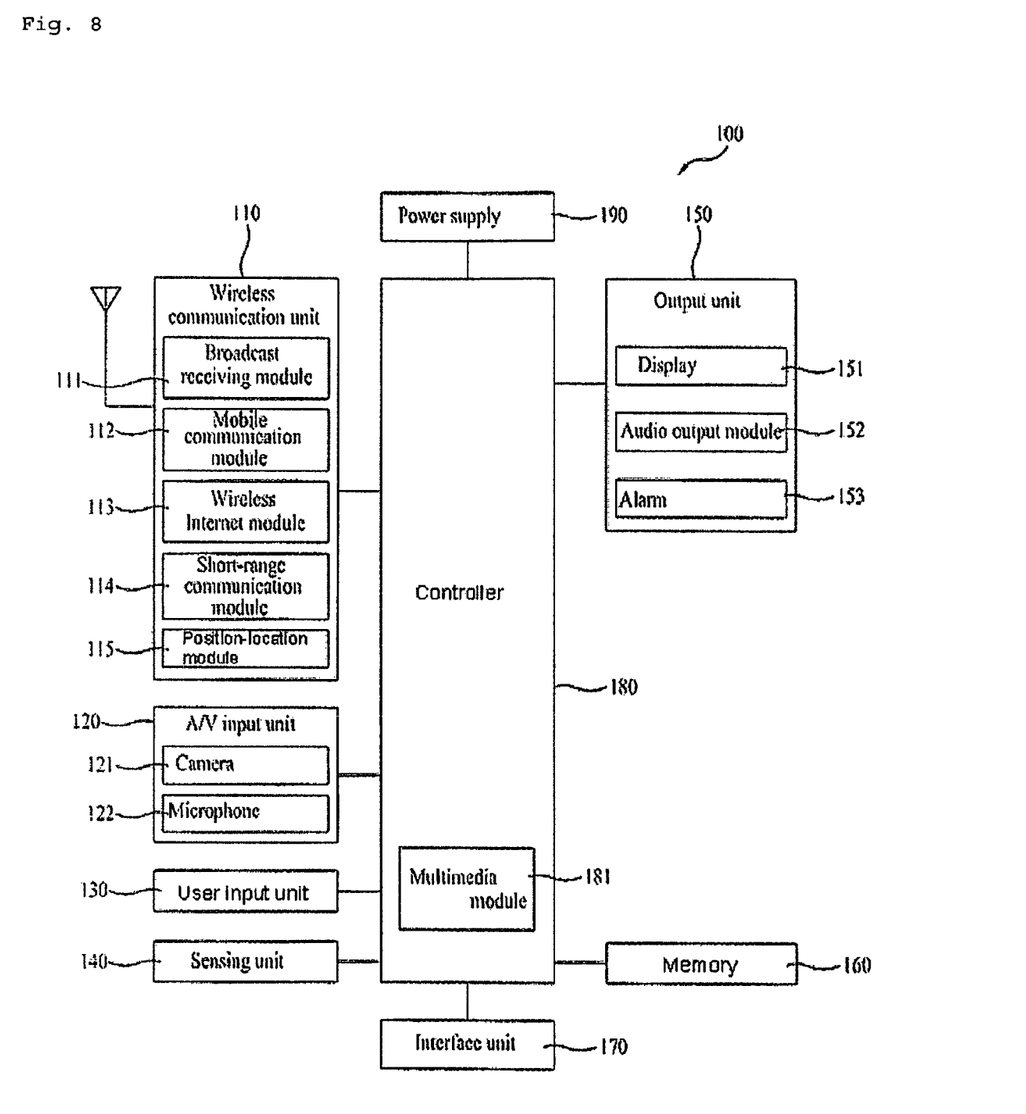
FIG. 8 is a block diagram of a mobile device in accordance with an embodiment of the present invention.

FIG. 8 is a block diagram of mobile device 100 in accordance with an embodiment of the present invention. The mobile device may be implemented using a variety of different types of devices. Examples of such devices include mobile phones, user equipment, smart phones, computers, digital broadcast devices, personal digital assistants, portable multimedia players (PMP) and navigators. By way of non-limiting example only, further description will be with regard to a mobile device. However, such teachings apply equally to other types of devices. FIG. 8 shows the mobile device 100 having various components, but it is understood that implementing all of the illustrated components is not a requirement. Greater or fewer components may alternatively be implemented.

FIG. 8 shows a wireless communication unit 110 configured with several commonly implemented components. For instance, the wireless communication unit 110 typically includes one or more components which permits wireless communication between the mobile device 100 and a wireless communication system or network within which the mobile device is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module ill may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile device. This module may be internally or externally coupled to the device.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile device. If desired, this module may be implemented using global positioning system (GPS) components which cooperate with associated satellites, network components, and combinations thereof.

Audio/video (A/V) input unit 120 is configured to provide audio or video signal input to the mobile device. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a touch screen panel, a jog wheel and a jog switch.

The sensing unit 140 provides status measurements of various aspects of the mobile device. For instance, the sensing unit may detect an open/close status of the mobile device, relative positioning of components (e.g., a display and keypad) of the mobile device, a change of position of the mobile device or a component of the mobile device, a presence or absence of user contact with the mobile device, orientation or acceleration/deceleration of the mobile device. The sensing unit 140 may comprise an inertia sensor for detecting movement or position of the mobile device such as a gyro sensor, an acceleration sensor etc. or a distance sensor for detecting or measuring the distance relationship between the user's body and the mobile device.

The interface unit 170 is often implemented to couple the mobile device with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile device. Display 151 is typically implemented to visually display information associated with the mobile device 100. For instance, if the mobile device is operating in a phone call mode, the display will generally provide a user interface or graphical user interface which includes information associated with placing, conducting, and terminating a phone call. As another example, if the mobile device 100 is in a video call mode or a photographing mode, the display 151 may additionally or alternatively display images which are associated with these modes.

A touch screen panel may be mounted upon the display 151. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile device may include one or more of such displays.

FIG. 8 further shows output unit 150 having an audio output module 152 which supports the audio output requirements of the mobile device 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile device. Typical events include call received, message received and user input received. An example of such output includes the providing of tactile sensations (e.g., vibration) to a user. For instance, the alarm 153 may be configured to vibrate responsive to the mobile device receiving a call or message. As another example, vibration is provided by alarm 153 as a feedback responsive to receiving user input at the mobile device, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile device. Examples of such data include program instructions for applications operating on the mobile device, contact data, phonebook data, messages, pictures, video, etc. The memory 160 shown in FIG. 8 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile device. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile device 100 may be implemented in a variety of different configurations. Examples of such configurations include folder-type, slide-type, bar-type, rotational-type, swing-type and combinations thereof. For clarity, further disclosure will primarily relate to a slide-type mobile device. However such teachings apply equally to other types of devices.

The mobile device 100 of FIG. 8 may be configured to operate within a communication system which transmits data via frames or packets, including both wireless and wireline communication Systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 9:
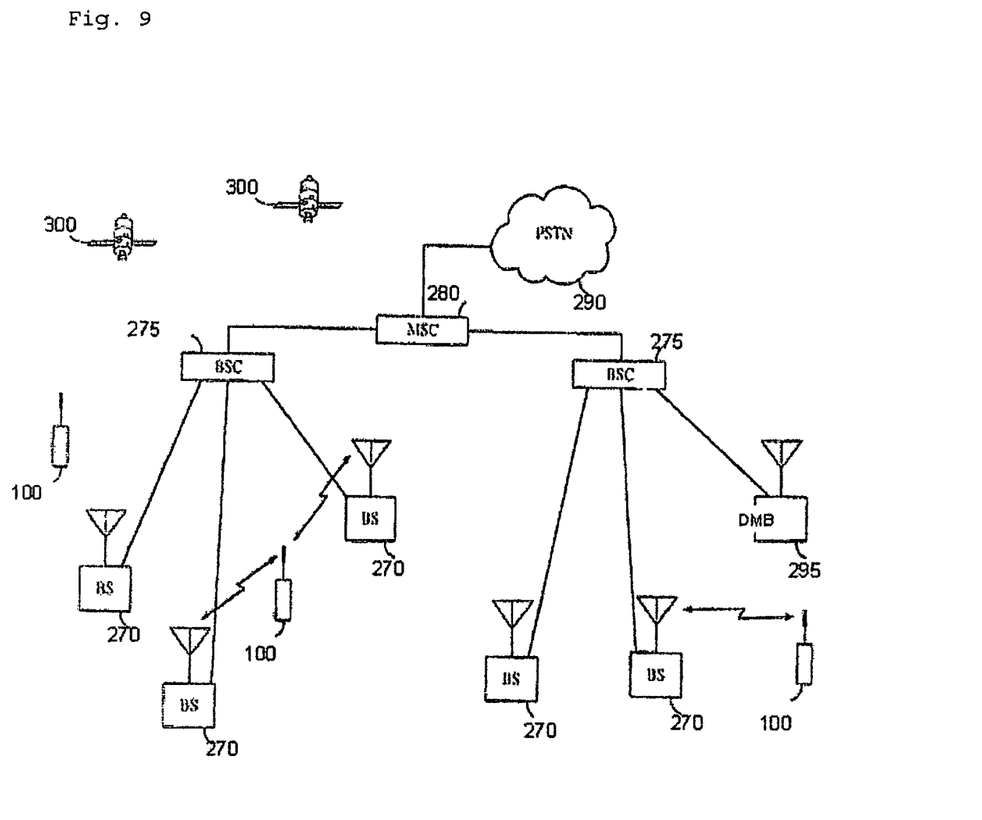
FIG. 9 is a block diagram of a CDMA wireless communication system operable with the mobile device of FIG. 8.

Referring now to FIG. 9, a CDMA wireless communication system is shown having a plurality of mobile devices 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable devices 100 operating within the system. The broadcast receiving module 111 (FIG. 8) of the portable device is typically configured to receive broadcast signals transmitted by the DMB transmitter 295. Similar arrangements may be implemented for other types of broadcast and multicast signaling (as discussed above).

FIG. 9 further depicts several global positioning system (GPS) satellites 300. Such satellites facilitate locating the position of some or all of the portable devices 100. Two satellites are depicted, but it is understood that useful positioning information may be obtained with greater or fewer satellites. The position-location module 115 (FIG. 8) of the portable device 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile devices 100. The mobile devices 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile devices 100.

While this document has been described in connection with what is presently considered to be practical exemplary embodiments, it is to be understood that this document is not limited to the disclosed embodiments, but, on the contrary, is intended to cover various modifications and equivalent arrangements included within the spirit and scope of the appended claims.

The foregoing embodiments and advantages are merely exemplary and are not to be construed as limiting this document. The present teaching can be readily applied to other types of apparatuses. The description of the foregoing embodiments is intended to be illustrative, and not to limit the scope of the claims. Many alternatives, modifications, and variations will be apparent to those skilled in the art.

The electronic device equipped with the touch device and the method of executing functions of the electronic device in accordance with the embodiments of this document have the following advantages.

First, the embodiments of this document have an advantage in that a convenient user interface environment can be provided to a user by employing device characteristics of the touch device.

Second, the embodiments of this document have an advantage in that various touch input methods can be provided unlike existing simple touch input methods.

While this document has been described in connection with what is presently considered to be practical exemplary embodiments, it is to be understood that this document is not limited to the disclosed embodiments, but, on the contrary, is intended to cover various modifications and equivalent arrangements included within the spirit and scope of the appended claims.

What is claimed is:

1. A method of executing functions in an electronic device equipped with a touch device, the method comprising:
receiving a first touch to a first position on the touch device on a displayed image;
upon receiving the first touch, dividing an entire screen on the touch device into at least two regions with the first position being an intermediate position,
wherein the first touch is irrespective of the displayed image content;
displaying an indicator for guiding a plurality of second touches corresponding to the divided at least two regions,
wherein the indicator indicates the at least two regions for receiving each of the plurality of second touches, types of the plurality of second touches, and a plurality of functions for matching the at least two regions with the types of the plurality of second touches;
eliminating displaying of the indicator upon receiving an input of turning off a function of displaying the indicator;
receiving a specific second touch to a specific region of the at least two regions on the touch device subsequent to the first touch and while the first touch is held to the first position,
wherein a type of the specific second touch is one of the types of the plurality of second touches, a second position for receiving the specific second touch is any position in the specific region, and the second touch is irrespective of the displayed image content; and
executing a specific function for matching with the specific region and the type of the specific second touch.

2. The method of claim 1, wherein the specific function is one of a scroll function, an enlarge function, a delete function and a menu display function.

3. The method of claim 1, wherein the step of receiving the specific second touch comprises:
receiving the specific second touch within a predetermined time period from a time of the first touch while the first touch is held to the first position.

4. The method of claim 1, wherein the step of executing the specific function comprises:
executing a first function corresponding to a first relative position of the specific second position with respect to the first position; and
executing a second function, different from the first function, corresponding to a second relative position of the specific second position with respect to the first position.

5. The method of claim 4, wherein the first and second functions are different ones of a scroll function, an enlarge function, a delete function and a menu display function.

6. The method of claim 4, wherein the first and second relative positions of the specific second position are located to the left and right of the first position, respectively.

7. The method of claim 6, wherein the second function comprises displaying a menu.

8. The method of claim 4, wherein the step of executing the second function comprises:
executing one of two second functions depending on a relative distance between the first position and the specific second position.

9. The method of claim 8, wherein the first function and the two second functions comprise different ones of a scroll function, an enlarge function, a delete function and a menu display function.

10. The method of claim 1, wherein the specific second touch comprises a single touch on the specific second position.

11. The method of claim 1, wherein the specific second touch comprises plural touches on the specific second position.

12. The method of claim 1, wherein the step of executing the specific function comprises:
executing a first function if the specific second position is touched once; and
executing a second function, different from the first function, if the specific second position is touched more than once.

13. The method of claim 1, wherein the specific function is set by a user.

14. The method of claim 1, wherein the first and second touch each comprises one of a physical touch and a proximity touch.

15. The method of claim 1,
wherein when the touch device comprises a touch screen, the specific function is irrespective of types of information displayed on the touch screen.

16. The method of claim 1, wherein the touch device comprises a touch pad or a touch screen.

17. The method of claim 1, wherein
the step of receiving the first touch to a first position on the touch device comprises receiving the first touch to an object displayed at the first position, and
the specific function is a function related to the touched object.

18. An electronic device, comprising:
a touch device configured to
receive a first touch to a first position on the touch device on a displayed image;

upon receiving the first touch, divide an entire screen on the touch device into at least two regions with the first position being an intermediate position, wherein the first touch is irrespective of the displayed image content;

display an indicator for guiding a plurality of second touches corresponding to the divided at least two regions, wherein the indicator indicates the at least two regions for receiving each of the plurality of second touches, types of the plurality of second touches, and a plurality of functions for matching the at least two regions with the types of the plurality of second touches, eliminate display of the indicator upon receiving an input of turning off a function of displaying the indicator, receive a specific second touch to a specific region of the at least two regions on the touch device subsequent to the first touch and while the first touch is held to the first position, wherein a type of the specific second touch is one of the types of the plurality of second touches, a second position for receiving the specific second touch is any position in the specific region, and the second touch is irrespective of the displayed image content; and a controller operatively connected to the touch device and configured to execute a specific function for matching with the specific region and the type of the specific second touch.

19. The electronic device of claim 18, wherein the specific function is one of a scroll function, an enlarge function, a delete function and a menu display function.

20. The electronic device of claim 18, wherein the controller is configured to execute the specific function when the specific second touch is received within a predetermined time period from a time of the first touch while the touch on the first position is maintained.

21. The electronic device of claim 18, wherein the controller is configured to execute a first function corresponding to a first relative position of the specific second position with respect to the first position; and execute a second function, different from the first function, corresponding to a second relative position of the specific second position with respect to the first position.

22. The electronic device of claim 21, wherein the first and second functions are different ones of a scroll function, an enlarge function, a delete function and a menu display function.

23. The electronic device of claim 21, wherein the first and second relative positions of the specific second position are located to the left and right of the first position, respectively.

24. The electronic device of claim 21, wherein the second function comprises a menu function.

25. The electronic device of claim 18, wherein the specific second touch comprises a single touch on the specific second position.

26. The electronic device of claim 18, wherein the specific second touch comprises plural touches on the specific second position.

27. The electronic device of claim 18, wherein the controller is configured to execute a first function if the specific second position is touched once; and execute a second function, different from the first function, if the specific second position is touched more than once.

28. The electronic device of claim 18, wherein the specific function is set by a user.

29. The electronic device of claim 18, wherein the first and second touch each comprises one of a physical touch and a proximity touch.

30. The electronic device of claim 18, wherein when the touch device comprises a touch screen, the specific function is irrespective of types of information displayed on the touch screen.

31. The electronic device of claim 18, wherein the touch device comprises a touch pad or a touch screen.

32. The electronic device of claim 18, wherein the specific function is a function related to an object displayed on a display of the electronic device.

* * * * *